United States Patent Office 3,450,613
Patented June 17, 1969

3,450,613
EPOXY ADHESIVE CONTAINING ACRYLIC ACID-EPOXY REACTION PRODUCTS AND PHOTOSENSITIZERS
Israel V. Steinberg, Rochester, N.Y., assignor to Bausch & Lomb Incorporated, Rochester, N.Y., a corporation of New York
No Drawing. Filed Mar. 9, 1964, Ser. No. 350,536
Int. Cl. C08f 1/16; B01j 1/10
U.S. Cl. 204—159.15             13 Claims

ABSTRACT OF THE DISCLOSURE

An optical cement comprising the reaction product of an epoxy resin prepolymer containing at least two epoxy groups with an $\alpha$-$\beta$-ethylenically unsaturated carboxylic acid together with a photosensitizer which activates the double bond in the reaction product upon exposure to light.

---

This invention relates to a novel optical cement and more particularly to a photosensitive epoxy cement which may be used in the manufacture of compound optical elements.

In the manufacture of compound optical elements, it is desirable to obtain the superior qualities of epoxy cements, together with the high speed polymerization of commercial photo resins such as "Kodak Photo Resist." The high speed polymerization is particularly desirable for use in the so-called "automated" processes wherein the relatively time consuming precision hand assembly of optical elements such as microscope objectives has been eliminated. One such process is disclosed in the U.S. patent of A. M. Bergmann 2,919,626.

Processes such as the aforementioned method of Bergmann may employ the "stick-method" for centering lens. This method comprises lowering a flat piece of hardwood with one or more prongs against the upper face of a lens. The lens is disposed on a mating lens or circular edge. The lens carrying element is rotated while the prongs are forced against the surface of the lens. The rotation is continued until the two images reflected by the two surfaces of the lens are motionless i.e. until the optical axis or axes of the lenses coincide. The various elements are then cemented in place.

The cementing operation requires a cement which has a sufficiently low viscosity during the centering operation to permit shifting of the elements to thereby obtain axial alignment. The cement should also be characterized by rapid or controlled polymerization so that the cement may be rapidly solidified. The rapid solidification prevents movement of the elements during successive operation. Accordingly, the process may be speeded up to afford substantial commercial economies. This commercial economy is relatively important in view of the highly competitive nature of the optical business.

Even though the commercial advantages obtained by using photo sensitive cements are substantial, they do not overshadow the relatively important optical and physical characteristics which are required by the optical industry. For example, it is imperative that optical cements do not yellow, craze or otherwise detract from the optical performance of the systems. It is also imperative to obtain satisfactory adhesion and expansion characteristics. In addition to the good adhesion, and the low shrinkage properties, the epoxy cements generally exhibit excellent mechanical properties.

Polymerization of epoxy resin prepolymers is normally accomplished by means of curing agents such as acid anhydrides or amines. The cure may be effected by heating a mixture of epoxy resin prepolymers and the curing agent for a suitable period of time at temperatures of approximately 60–150° C. In these cases the cure is generally initiated immediately upon admixture of the curing agent and the prepolymer. The exothermic reaction which normally occurs produces rapid insolubilization and complete curing. Accordingly after the addition of a curing agent the "pot life" of a mix is relatively short. This short period occurs even though the mix is maintained at room temperature. Additional problems are encountered in working with the mix as the viscosity of the mix increases relatively rapidly, and the low range of viscosity may be maintained for only a relatively short period of time. The short pot life, and relatively slow curing of epoxy resins are undersirable in the manufacture of commercially competitive optical systems.

The United States patent of Workman 3,074,869 discloses a photosensitive epoxy composition which employs a nitrosamine. Cements of this type overcome many of the problems previously associated with epoxy cements. However, such cements require a relatively intense light source and a relatively long exposure to the high intensity light in order to produce sufficient polymerization for optical purposes.

Cements according to the present invention have many of the advantages offered by the photo sensitive resins such as maximum light sensitivity. The cements are relatively fast i.e. they may be activated by exposure to a relatively low intensity light source for a relatively short period of time. The exposure to light sufficiently rigidifies the cement to permit routine manipulations of the assemblies without displacing the relative positions of the various elements. A final polymerization may be obtained by a heat treatment to provide a hard durable bond.

Advantageously, the cements disclosed herein are characterized by the desirable properties which were previously associated with conventional epoxy cements. The cements are also relatively free from color and have relatively good aging characteristics. Furthermore the adhesion and expansion characteristics as well as the pot life are at least as good and in the latter case superior to those of conventional epoxy resins. For example, the viscosity of the novel cements according to the present invention may be controlled within a relatively low range for relatively long periods of time.

It has also been found that the novel cements according to the present invention may be readily removed prior to photo polymerization by means of a commercial solvent such as acetone. The acetone has also been found to be effective for softening the photo polymerized cement when it is desired to remove the cement or portions thereof prior to final polymerization i.e. prior to obtaining a hard set by a final heat treatment.

Briefly, the novel photo polymerizable epoxy resins according to the present invention comprise a reaction product of an epoxy resin prepolymer and an alpha-beta ($\alpha$-$\beta$) ethylenically unsaturated organic acid. This product is an ethylenically unsaturated epoxy ester. An amount of photosensor, at least sufficient to actuate the double bond in the ethylenically unsaturated epoxy ester upon exposure to light is added to the mixture.

The epoxy resin prepolymer must contain at least two epoxy groups, for example, it may comprise vinylcyclohexene diepoxide. A monobasic ethylenically unsaturated acid such as acrylic or methacrylic acid is added to the prepolymer in the molar ratio of one mole or less of acid to each mole of prepolymer. The ratio of epoxy equivalents to acid equivalents is therefore 2 to 1. The resulting product contains both epoxy and unsaturated ester groups. The product is catalyzed with a photo sensitive compound such as benzoin or anthraquinone. The catalyzed product has been found to polymerize relatively rapidly upon exposure to ultraviolet light or upon exposure to a tungsten light source. For example, exposure to a 275 watt sunlamp at a distance of 6 inches for 15–20 seconds caused gelation of the cement. The final hard cure was then obtained by heating so that the epoxy groups combined with the available hydroxyl groups. In some cases, it is also desirable to add additional polyfunctional acids or bases.

Epoxy resins as used herein refer to the diepoxides or polyepoxides such as epoxidized polybutadiene (Oxiron 2001), epoxidized linseed oil (Epoxol 9–5), 1,4-butane diglycidyl ether (Araldite RD–2), vinylcyclohexene diepoxide (Epoxide 206), 3,4-epoxy-6-methylcyclohexylmethyl-3,4-epoxy-6 methylcyclohexanecarboxylate (Epoxide 201), resorcinol diglycidyl ether (Kopoxite 159), Bisphenol A-diglycidyl ether (DER–332), S-tetraphenylethane tetra-glycidyl ether (Epon 1031), novolac resin polyglycidyl ether (DEN 438), dicyclopentadiene diepoxide (Epoxide 207) and dipentene dioxide (Epoxide 269).

The present invention is further illustrated by but is not limited to the following examples wherein the parts and percentages are given by weight and equivalents, and the photo polymerizable compositions are made under conditions that they are not exposed significantly to actinic light.

Example 1

4.2 grams (.06 epoxy equivalents) of vinylcyclohexene diepoxide, and a cycloaliphatic compound available as Epoxide 206 from the Union Carbide Chemical Company were combined with 2.16 grams (.03 equivalent) of glacial acrylic acid. The mixture was maintained at room temperature (25°–26° C.) for 24 hours. The resulting reaction product was photosensitized by adding 0.5% by weight of benzoin. A sample of this photocement, about one-eighth of an inch thick, was exposed to a 275 watt sunlamp at a distance of six inches. After 15 seconds the fluid cement became a soft colorless gel, and after 30 seconds, a firm colorless gel. The colorless gel obtained by a 30 second exposure is sufficiently firm for holding cemented parts together during normal handling operations without observable movement. Any relative movement of the optical elements which were bonded together in this manner were imperceptable even under high magnification. The completed cure is effected at 125° C. for two hours during which time no movement of the parts took place even though no clamps or fixtures were used.

Example 2

A photocement such as the one decsribed in Example 1 may be treated with a dicarboxylic acid anhydride such as methyl succinic anhydride before or after the addition of the benzoin. For example, the photocement made from 0.06 equivalent of vinylcyclohexene diepoxide and 0.03 equivalent of acrylic acid was treated after the polymerization reaction at 25–26° C., with 0.01 mole of methyl succinic anhydride and 0.032 gram (0.5%) of benzoin. A ⅛ inch layer of this cement, when exposed at 6 inches from a 275 watt sunlamp gelled in 15 seconds. Final cure required heating at 125° C. for 2 hours. The addition of the dicarboxylic acid anhydride improved the speed of gelation.

Example 3

In some cases it is desirable to add a tertiary amine to the reaction product of an epoxy resin which contains at least two epoxy groups and an alpha-beta ethylenically unsaturated organic acid before or after the addition of the photosensitizer in order to catalyze the final cure whereby reduced curing temperature may be employed. 0.5 gram of the cement described in Example 1 and which had been treated with 0.5% of benzoin was added 0.015 gram (2%) of dimethylbenzylamine. When exposed at 6 inches distance from a 275 watt sunlamp, a ⅛ inch sample of this cement gelled in less than 15 seconds. Final cure was effected at 60° C. for 16 hours.

Example 4

0.06 epoxide equivalent of vinylcyclohexene diepoxide was treated with 0.03 equivalent of methacrylic acid, and the mixture was maintained at 25–26° C. for 48 hours. The reaction product was photosensitized by adding 0.5% by weight benzoin. A soft gel was produced in two minutes. Upon exposure to a 275 watt sunlamp at a distance of six inches a firm gel resulted after three minutes of exposure. The storage life of this cement at 25° F. was more than eight months.

Example 5

The reaction product obtained in Example 4 was treated with a cross linking agent. The cross linking agent used in this example was methyl succinic anhydride. 0.85 gram of the cement was added to 0.143 gram (.0013 mole) of anhydride. Exposure to a 275 watt sunlamp at a distance of six inches resulted in a gel formation in one minute. The shelf life of this cement at 25° F. was found to be more than eight months.

Example 6

The photosensitized cement according to Example 4 was treated with 3% by weight dimethylbenzylamine. A ⅛ inch thick sample was exposed to a 275 watt sunlamp at a distance of 6 inches. Gelation occurred upon an exposure of between 15 and 30 seconds. The shelf life of this compound exceeded 8 months when stored at 25° F.

Example 7

Two epoxide equivalents of 3,4-epoxy-6-methylcyclohexylmethyl-3,4-epoxy-6 methylcyclohexanecarboxylate, a cycloaliphatic diepoxide, was reacted with one equivalent of acrylic acid for 26.5 hours at 25–26° C. A sample (1.32 g.) of this cement was treated with 0.0066 gram (0.5%) benzoin and a 275 watt sunlamp at a distance of 6 inches. Gelation occurred in 15 seconds. The storage life at 25° F. of this cement was found to exceed 55 days.

Example 8

An epoxy resin (Dow D.E.R. 332) which is a reaction product of Bisphenol A and epichlorohydrin and is a diepoxide was reacted with acrylic acid in the ratio of 0.02 equivalent of epoxide to 0.01 equivalent of acid for 96 hours at 60° C. The resulting cement was treated with benzoin 0.5% by weight, and exposed to a 275 watt sunlamp at a distance of 6 inches. A soft gel was obtained in 1 minute.

Example 9

0.04 epoxide equivalents of resorcinol diglycidyl ether (Kopoxide 159 of Koppers Chemical Co.) were reacted with 0.02 equivalent of acrylic acid and 0.033 gram (0.5% by weight) of benzoin for 24 hours at 60–62° C. A sample (1.87 grs.) of this cement was treated with 0.253 gram of methylsuccinic anhydride and the mixture was illuminated by a 275 watt sunlamp for a distance of 6 inches. A gel was obtained after 45 seconds of exposure.

Example 10

Resorcinol diglycidyl ether .03 epoxide equivalent was reacted with 0.15 equivalent of glacial methacrylic acid at 60° C. for 472 hours. The reaction product was then treated with benzoin (0.5% by weight) and exposed to a 275 watt sunlamp from a distance of 6 inches. Gelation occurred in one minute. Storage life at 25° F. exceeded 6 months.

Example 11

An epoxidized polybutene resin such as Oxiron 2001 has a viscosity of about 160 poise at 25° C. 9.46 grams (0.06 epoxide equivalent) of this material was treated with 2.16 g. (0.03 equivalent) of acrylic acid and 0.058 gram of benzoin (0.5% by weight) and the mixture was stirred and maintained at about 25.5° C. for 48 hours. A ⅛″ thick sample was exposed to a 275 watt sunlamp at a distance of 6 inches. A soft gel was obtained in 30 seconds and a firm gel was obtained in 60 seconds.

Example 12

An epoxidized linseed oil available as Epoxol 9–5 from Swift & Company has an average of 5.5 epoxide groups per molecule. The three 18-carbon chains provide flexibility to epoxy resins made from this material. A mixture of 7.24 grams (0.04 epoxy equivalent) of epoxidized linseed oil, 1.44 grams of acrylic acid (.02 equilavent) and 0.043 gram of benzoin (0.5% by weight) was heated and stirred at 40° C. for 70 hours. A small sample was exposed to the light emanating from a 275 watt sunlamp at a distance of 6 inches. A gel was obtained from a 30 second exposure. When stored at 25° F. this cement remained liquid for 3 months. At room temperature, the storage life was found to be over 3 weeks.

Example 13

In each of the foregoing examples, benzoin was the photosensitizer or photocatalyst employed. It should be pointed out, however, that other photocatalysts may be used in place of benzoin. Other materials which may be substituted for benzoin are chloranil, benzil, diacetyl, 2,4-dinitrotoluene, 5-nitrosalicylaldehyde etc. Table I shows the relative rates of gelation of the photocement made from vinylcyclohexane diepoxide and acrylic acid (as in Example 1) using 0.5% of various photosensitizers.

TABLE I.—PHOTOCEMENTS WITH VARIOUS PHOTOSENSITIZERS (0.5%) EXPOSED AT 6 INCHES FROM A 275 WATT SUNLAMP

Photosensitizers: Gelation time, seconds
Benzoin _____ 15
Chloranil _____ 180
Benzil _____ 15
Diacetyl _____ 30
2,4-dinitrotoluene _____ 150
5-nitrosalicyclaldehyde _____ 90 layers were ⅛″ thick. It has been found, however, that when the cement layer is much thiner, for example, a few mils thick as used between optical lenses, polymerization occurs in 1 or 2 minutes even with the tungsten lamp.

TABLE II.—RATES OF PHOTOPOLYMERIZATION USING VARIOUS LAMPS EPOXOL-ACRYLIC ACID-BENZOIN CEMENT

| Lamp | Wattage | Distance from sample, inches | Polymerization time, seconds |
|---|---|---|---|
| Sunlamp | 275 | 6 | 15 |
| Carbon arc | | 6 | 90 |
| Infrared | 275 | 6 | 480 |
| Tungsten | 300 | 6 | 1,440 |

Example 15

The amount of photosensitizer used in the photocements described in the examples may be varied over a wide range. For example, the photocement made from vinylcyclohexene diepoxide and acrylic acid (see Example 1) was treated with various amounts of benzoin from 0.5% down to 0.008% and exposed to a 275 watt sunlamp from a distance of 6 inches. The data on speed of gelation vs. benzoin concentration appears in Table III.

TABLE III.—RATE OF PHOTOPOLYMERIZATION OF PHOTOCEMENT FROM VINYLCYCLOHEXENE DIEPOXIDE+ACRYLIC ACID

Percent benzoin: Time to photopolymerize, seconds
0.50 _____ 15
0.10 _____ 15
0.04 _____ 30
0.008 _____ 75

It has also been found that various different photo catalysts in different amounts may be used to sensitize the various cements called for in the appended claims. The following table is not to be construed as limiting but is given by way of further illustration to indicate the broad range of variables encompassed by the present application.

TABLE IV.—GELATION TIME OF VARIOUS PHOTOCEMENTS CATALYZED BY SEVERAL DIFFERENT PHOTOCATALYSTS EXPOSED TO A 275-WATT SUNLAMP AT 6 INCHES

| Photocement prepared from— | Photocatalyst | Percent photocatalyst | Time to reach gelation, min. |
|---|---|---|---|
| Vinylcyclohexene diepoxide and acrylic acid | Benzoin | 0.1 | 0.25 |
| | Chloranil | 1.0 | 3.0 |
| | Benzil | 1.0 | 0.25 |
| | Diacetyl | 1.0 | 0.5 |
| | 5-nitrosalicylaldehyde | 1.0 | 1.5 |
| | 2,4-dinitrotoluene | 1.0 | 2.5 |
| Epoxidized linseed oil (Swift Epoxol 9-5) and acrylic acid | Benzoin | 0.5 | 0.2 |
| | Benzil | 0.18 | 1.5 |
| | Diacetyl | 0.14 | 2.5 |
| | 6-nitroquinoline | 0.14 | 4.0 |
| Bisphenol-A-diglycidylether (DOW DER 332) and acrylic acid | Benzoin | 0.5 | 0.75 |
| | Benzil | 0.19 | 1.0 |
| | Diacetyl | 0.17 | 5.0 |
| | 5-nitrosalicylaldehyde | 0.19 | 8.0 |
| | 2,4-dinitrotoluene | 0.26 | 15.0 |
| Epoxidized polybutadiene (Oxiron 2001) and acrylic acid | Benzoin | 0.5 | 0.5 |
| | Benzil | 0.20 | 2.0 |
| | Diacetyl | 0.23 | 6.0 |
| Resorcinol diglycidylether and acrylic acid | Benzoin | 0.5 | 0.25 |
| | Benzil | 0.17 | 0.25 |
| | Diacetyl | 0.19 | 4.0 |
| | 5-nitrosalicylaldehyde | 0.19 | 1.5 |
| | 6-nitroquinoline | 0.20 | 3.0 |
| | 2,4-dinitrotoluene | 0.20 | 3.0 |
| Resorcinol diglycidylether and methacrylic acid | Benzoin | 0.5 | 1.0 |

Example 14

Various light sources were evaluated with respect to the time for gelation. The time for gelation of the photocement disclosed in Example 1 and which included benzoin was tested with four different light sources. Two of these four lamps had a substantial amount of ultraviolet light (less than 4000 A.) and caused a rapid polymerization, while the other two which had much smaller amounts of ultraviolet light produced much slower polymerization. The data appears in Table II. In these tests the cement

What is claimed is:

1. The photosensitive composition comprising the reaction product of an epoxy resin prepolymer containing at least two epoxy groups and an α-β-ethylenically unsaturated carboxylic acid selected from the group consisting of acrylic and methacrylic acid together with between 0.008 and 1% by weight photosensitizer selected from the group consisting essentially of benzoin, chloranil, benzil, diacetyl, 5-nitrosalicylaldehyde and 2,4-dinitrotoluene in which the ratio of the epoxy equivalents to acid equivalents is greater than 1 to 1 respectively so that the resulting product contains epoxy groups.

2. A photosensitive composition according to claim 1 in which the epoxy resin consists essentially of vinylcyclohexene diepoxide and the acid consists essentially of glacial acrylic acid.

3. A photosensitive composition according to claim 1 in which the epoxy resin consists essentially of vinylcyclohexene diepoxide and the acid consists essentially of methacrylic acid.

4. A photosensitive composition according to claim 3 which further includes a cross linking agent selected from the group consisting essentially of methyl succinic anhydride and a tertiary amine.

5. A photosensitive composition comprising the reaction product of vinylcyclohexene diepoxide and methacrylic acid which are present in the ratio of two epoxide equivalents to one acid equivalent and which includes ½% by weight benzoin.

6. A photosensitive composition according to claim 5 which further includes 3% by weight dimethylbenzylamine.

7. A photosensitive composition according to claim 1 in which the epoxy resin is Bisphenol A-diglycidyl ether and in which the acid is acrylic acid.

8. A photosensitive composition according to claim 1 which includes 2–3% dimethylbenzylamine.

9. A photosensitive composition according to claim 1 in which the epoxy resin consists essentially of resorcinol diglycidyl ether.

10. A photosensitive composition according to claim 1 in which the epoxy resin consists essentially of epoxidized polybutene resin.

11. A photosensitive composition according to claim 1 in which epoxy resin consists essentially of epoxidized linseed oil.

12. A photosensitive composition comprising the reaction product of an epoxy resin prepolymer selected from the group consisting essentially of epoxidized polybutadiene, epoxidized linseed oil, 1,4-butane diglycidyl ether, vinylcyclohexene diepoxide, 3,4-epoxy-6-methylcyclohexylmethyl - 3,4 - epoxy - 6 - methylcyclohexanecarboxylate, resorcinol diglycidyl ether, Bisphenol A-diglycidyl ether, S-tetraphenylethane tetra-glycidyl ether, novolac resin polyglycidyl ether, dicyclopentadiene diepoxide and dipentene dioxide, and an α-β-ethylenically unsaturated carboxylic acid selected from the group consisting essentially of acrylic and methacrylic acid together with between .008 and 1.0% by weight photosensitizer selected from the group consisting essentially of benzoin, chloranil, benzil, diacetyl, 5-nitrosalicylaldehyde and 2,4-dinitrotoluene in which the ratio of epoxy equivalents to acid equivalents is greater than 1 to 1 respectively so that the resulting product contains epoxy groups.

13. A photosensitive composition comprising the reaction product of two epoxy equivalents of 3,4-epoxy-6-methylcyclohexylmethyl - 3,4 - epoxy - 6 - methylcyclohexanecarboxylate and one equivalent of acrylic acid together with 0.008 to 1% by weight photosensitizer selected from the group consisting essentially of benzoin, chloranil, benzil, diacetyl, 5-nitrosalicylaldehyde and 2,4-dinitrotoluene.

References Cited

UNITED STATES PATENTS

| | | | |
|---|---|---|---|
| 3,256,226 | 6/1966 | Fekete et al. | 260—23.5 |
| 3,205,157 | 9/1965 | Licari et al. | 204—158 |
| 3,074,869 | 1/1963 | Workman | 204—158 |
| 2,760,863 | 8/1956 | Plambeck | 95—5.6 |

OTHER REFERENCES

Lee and Neville, Epoxy Resins (1957), McGraw-Hill, pp. 48–51 and 116–118.

MURRAY TILLMAN, *Primary Examiner.*

R. B. TURER, *Assistant Examiner.*

U.S. Cl. X.R.

204—159.18, 159.23; 260—2, 23, 47, 836, 837